United States Patent
Goethel

(10) Patent No.: US 9,676,286 B2
(45) Date of Patent: Jun. 13, 2017

(54) MONITORING FOR FOREIGN BODIES DURING INDUCTIVE CHARGING

(71) Applicant: Bayerische Motoren Werke Aktiengesellschaft, Munich (DE)

(72) Inventor: Joachim Goethel, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 114 days.

(21) Appl. No.: 14/615,647

(22) Filed: Feb. 6, 2015

(65) Prior Publication Data
US 2016/0009186 A1    Jan. 14, 2016

Related U.S. Application Data

(63) Continuation of application No. PCT/EP2013/065985, filed on Jul. 30, 2013.

(30) Foreign Application Priority Data

Aug. 7, 2012 (DE) .................. 10 2012 213 958

(51) Int. Cl.
*H02J 7/00* (2006.01)
*B60L 11/18* (2006.01)
*H02J 7/04* (2006.01)

(52) U.S. Cl.
CPC ............... *B60L 11/182* (2013.01); *H02J 7/04* (2013.01); *B60L 2240/36* (2013.01);
(Continued)

(58) Field of Classification Search
USPC ........................................................ 320/108
See application file for complete search history.

(56) References Cited

U.S. PATENT DOCUMENTS 8,729,859 B2    5/2014  Cook et al.
8,854,216 B2    10/2014 Uchida
(Continued)

FOREIGN PATENT DOCUMENTS

CN    102089955 A    6/2011
CN    102377224 A    3/2012
(Continued)

OTHER PUBLICATIONS

Chinese Office Action issued in Chinese counterpart application No. 201380041791.6 dated Feb. 25, 2016, with English translation (Thirteen (13) pages).

(Continued)

*Primary Examiner* — Samuel Berhanu
(74) *Attorney, Agent, or Firm* — Crowell & Moring LLP

(57) ABSTRACT

A device having a charging unit and being configured for inductive power transmission from the charging unit to a vehicle, in which the charging unit comprises a primary coil and the vehicle comprises a secondary coil and in which the primary coil generates a magnetic transmission field in a transmission range between the primary coil and the secondary coil, wherein the vehicle has a sensor unit for temperature monitoring in the transmission range, the charging unit comprises a control unit and in a charging operation the transmission power can be controlled by the control unit as a function of a result of temperature monitoring.

4 Claims, 2 Drawing Sheets

(52) U.S. Cl.
CPC ...... *B60L 2270/147* (2013.01); *Y02T 10/7005* (2013.01); *Y02T 10/7072* (2013.01); *Y02T 90/122* (2013.01); *Y02T 90/14* (2013.01)

(56) References Cited

U.S. PATENT DOCUMENTS

| | | | |
|---|---|---|---|
| 2011/0074346 A1* | 3/2011 | Hall | B60L 3/00 320/108 |
| 2011/0128015 A1* | 6/2011 | Dorairaj | H02J 5/005 324/629 |
| 2012/0038317 A1 | 2/2012 | Miyamoto et al. | |
| 2012/0119698 A1 | 5/2012 | Karalis et al. | |

FOREIGN PATENT DOCUMENTS

| | | |
|---|---|---|
| CN | 102474133 A | 5/2012 |
| DE | 10 2011 117 685 A1 | 7/2012 |
| EP | 2 458 710 A1 | 5/2012 |
| FR | 2 947 114 A1 | 12/2010 |
| WO | WO 2009/081115 A1 | 7/2009 |
| WO | WO 2010/006078 A1 | 1/2010 |
| WO | WO 2012/084095 A2 | 6/2012 |

OTHER PUBLICATIONS

International Search Report dated Mar. 3, 2014 (Two (2) pages).
German Search Report dated Jul. 15, 2013, with Statement of Relevancy (Six (6) pages).

* cited by examiner

MONITORING FOR FOREIGN BODIES DURING INDUCTIVE CHARGING

CROSS REFERENCE TO RELATED APPLICATIONS

This application is a continuation of PCT International Application No. PCT/EP2013/065985, filed Jul. 30, 2013, which claims priority under 35 U.S.C. §119 from German Patent Application No. 10 2012 213 958.3, filed Aug. 7, 2012, the entire disclosures of which are herein expressly incorporated by reference.

BACKGROUND AND SUMMARY OF THE INVENTION

The invention relates to a device and a method having a charging unit and a vehicle for inductive power transmission from the charging unit to the vehicle, in which the charging unit comprises a primary coil and the vehicle comprises a secondary coil, and in which the primary coil generates a magnetic transmission field in a transmission range between the primary coil and the secondary coil.

Inductive power transmission systems are known from the prior art. FR 2 947 114 A1, for example, describes an induction charging device for a vehicle for charging an electrical energy storage mechanism in the vehicle, the induction charging device consists of a ground unit having a primary coil and an automotive unit having a secondary coil.

An induction charging device for an electric vehicle is designed for power transmission in the range of several kilowatts.

One object of the invention is to describe an improved device and an improved method having a charging unit and a vehicle for inductive power transmission from the charging unit to the vehicle.

Advantageous embodiments and refinements of the invention are derived from the dependent claims.

According to the invention, the vehicle has a sensor unit for monitoring the temperature in the transmission range and the charging unit comprises a control device which controls the transmission power in a charging operation as a function of a result of the temperature monitoring.

A charging operation is understood in particular to be the time segment during which there is a transmission of electric power from the charging unit to the vehicle. The control device controls and/or regulates the transmission power from the chronological beginning until the chronological end of the charging operation. The result of the temperature monitoring by the control unit serves as the input variable for the control and/or the regulation.

According to a preferred embodiment of the invention, the sensor unit is designed as an infrared detector system, which has a thermal resolution limit and a spatial resolution limit, such that an object having thermal properties above the thermal resolution limit and spatial properties above the spatial resolution limit is designated as a critical object, and a critical object situated in the transmission range can be detected by the infrared detector system.

If the critical object is detected by the infrared detector system, this detection is considered as the result of the temperature monitoring. In the case when no critical object is detected by the infrared detector system, this is considered as the result of the temperature monitoring.

This means that a critical object situated in the transmission range during a charging operation can be detected by the infrared detector system if it exceeds the thermal resolution limit of the infrared detector system, i.e., in particular has a sufficiently high temperature for detectability by the infrared detector system, and in combination therewith, exceeds the spatial resolution limit of the infrared detector system, i.e., in particular has a sufficiently large spatial extent for detectability by the infrared detector system.

The infrared detector system has an at least unidirectional communication setup to the control unit. In this way, a signal can be transmitted to the control unit when a critical object is detected by the infrared detector system. The signal transmitted may result in a control measure by the control unit, for example, an interruption in generation of a transmission field by the primary coil.

According to another variant of the invention, in a charging operation, the transmission power is adjustable at a first rate of power increase by the control unit, and in a charging operation, the transmission power is adjustable by the control unit at a second rate of power increase, such that the second rate of power increase exceeds the first rate of power increase.

The rate of power increase indicates the transmission power per unit of time. Thus, at the second rate of power increase, there is a faster increase in the transmission power over time by a certain amount than is the case at the setting of the first rate of power increase.

Furthermore, it is advantageous if, at the first rate of power increase, a standard object situated in the transmission range can be heated by the transmission field over a critical period of time if the standard object becomes a critical object within the critical period of time and, after detection of the standard object by the infrared detector system, the power increase in the transmission range can be interrupted by the control unit and/or the transmission power can be reduced.

With this device, a method comprising the following steps can be carried out. First, in a charging operation, the transmission power is increased by the control unit at the first rate of power increase during the critical period of time. After the critical period of time, the transmission power is increased by the control unit at the second rate of power increase. If a critical object is detected by the infrared detector system during the charging operation during the critical period of time or even after the critical period of time, the power increase in the transmission range is interrupted by the control unit and/or the transmission power in the transmission range is reduced by the control unit and/or a warning signal is output by the control unit or by the vehicle.

The invention is based on the considerations explained below:

For electrified vehicles, there are known methods which permit a non-contact, preferably inductive charging of the vehicle electric system and/or of the storage mechanism containing the same.

Since the energy transmission in inductive charging can be disturbed by metallic or electrically-conductive materials between the two sides of the non-contact transmission, measures are to be taken which detect such objects or materials and ensure countermeasures such as an interruption in the power transmission. This successfully prevents unwanted heating of the foreign bodies and possible negative consequences.

The monitoring methods known according to the prior art are either inadequate because overheating of very small or thin-walled conductive materials such as a metal film, for example, are not detected reliably or promptly. Exclusion of any potential threat due to overheating or foreign bodies, the vehicle or the vehicle surroundings, however, has the highest priority. Or the monitoring methods have a high degree of complexity so that additional cost-intensive and space-intensive hardware might be needed.

A measure is proposed which makes use of monitoring methods present in the prior art in combination with a targeted transmission power control in inductive charging for foreign body identification of particularly small and thin-walled conductors.

This measure presupposes that a vehicle is equipped with a vehicle-side inductive charging system. The vehicle charging system has as its main component in particular a secondary coil, with which electric power can be transmitted to the vehicle from a primary coil external to the vehicle. The inductive charging system of the vehicle comprises a sensory system, e.g., infrared sensors with which at least large foreign bodies in the power transmission range having a critically high temperature can be detected. Foreign bodies are to be expected in particular on and/or in the vicinity of the primary coil using the arrangement of the primary coil as an energy transmitter on the road surface and the secondary coil as an energy receiver on the vehicle underbody, and are to be evaluated critically with regard to unwanted energy absorption, which may result in an increase in temperature.

One disadvantage here is that large and solid conducting bodies in the energy transmission range can be detected securely and reliably using an infrared sensor system but small or very thin-walled conductors (e.g., parts of beverage packagings having a conductive coating) can be heated so rapidly in the energy transmission range that reaching the resolution limit of the infrared sensor system, i.e., the initial detection of elevated temperature takes place only when local combustion, for example, begins on the thin-walled conductor or on surrounding materials. The occurrence of such a state is to be avoided in any case, such that its probability of occurrence is increased, for example, by a spatially unfavorable orientation with initially thermal insulation of parts of the foreign body with respect to the infrared system (for example, turning the aluminum coating, which is in the energy transmission range, away from the infrared system in the case of a beverage carton). In this example, the local energy absorption by the aluminum coating is perhaps detected only when parts of the beverage carton might have already been damaged thermally. This is true in particular of the condition when energy transmission acts directly on the foreign body in its full intensity.

This disadvantage is counteracted by the fact that due to the reduction in energy transmission intensity, primarily due to a power control over time in inductive charging, heating of the foreign body is reduced to such an extent that, on the one hand, the sensor system can detect the unwanted heating and, on the other hand, a critical threshold is not reached (e.g., ignition temperature, injury threshold in subsequent contact the foreign body). In addition, it is possible through a sufficiently gradual power control over time to achieve the result that the heating (possibly very local) of the foreign body is adequately distributed over larger regions of the foreign body, so that the resolution limit of the monitoring sensor system is reached and reliably detects the larger region. The power control may be linear over time, continuous or in increments.

Advantages include the increase in the probability of detection of foreign bodies and thus the reduction in risk of damage in performing inductive charging. This increase can also be achieved in a neutral manner with regard to design space and weight, i.e., without the use of additional hardware.

A preferred exemplary embodiment of the invention is described below on the basis of the accompanying drawing. This yields additional details, preferred embodiments and refinements of the invention. In detail, this shows schematically Other objects, advantages and novel features of the present invention will become apparent from the following detailed description of one or more preferred embodiments when considered in conjunction with the accompanying drawing.

DETAILED DESCRIPTION OF THE DRAWING

Figure 1:
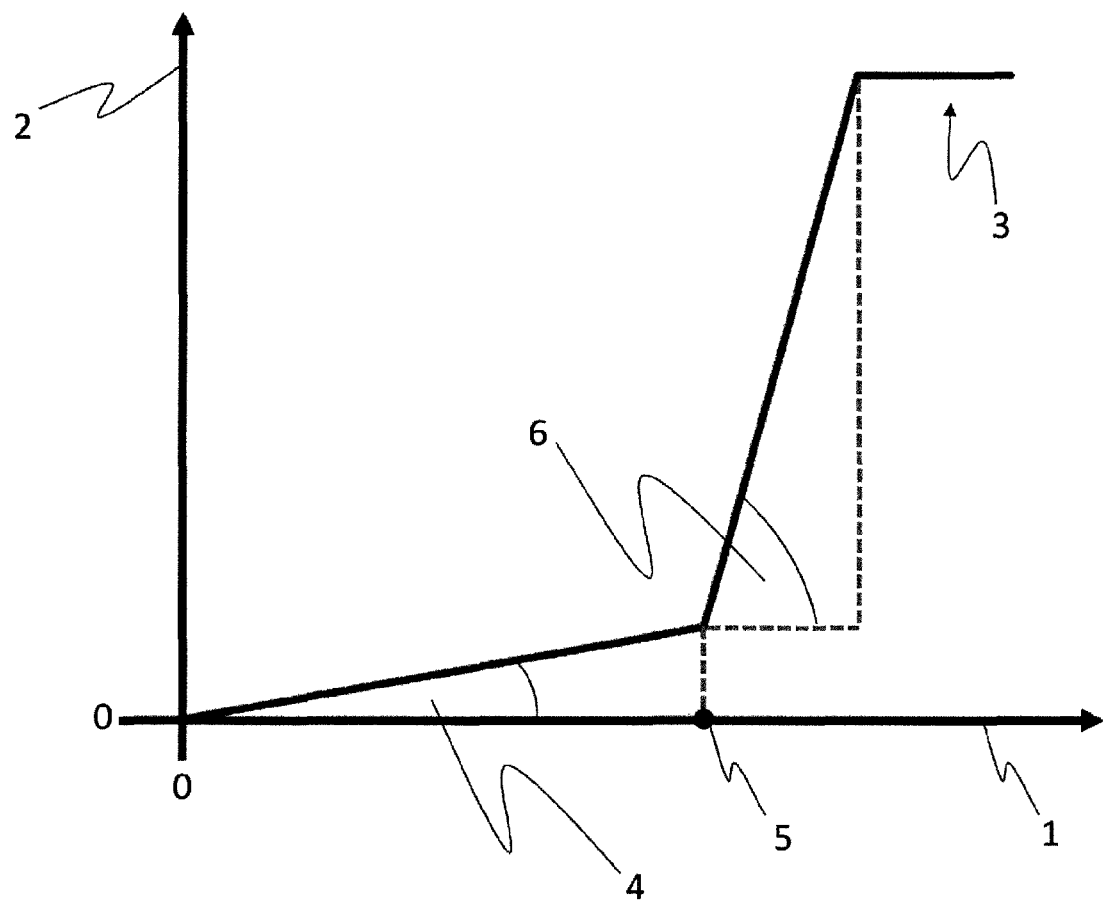
FIG. 1 transmission power in the transmission range in inductive charging.
Figure 2:
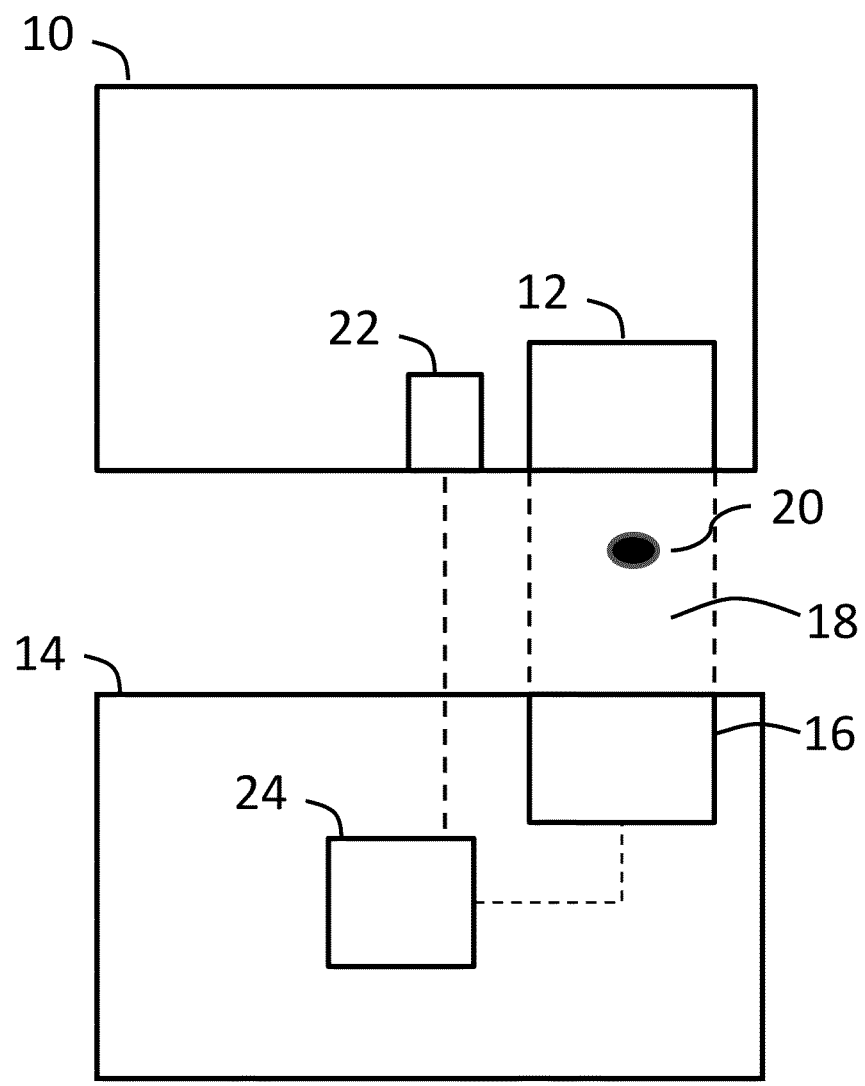
FIG. 2 illustrates a device configured in accordance with one the principles of the invention.

In inductive charging of a vehicle, electric power is transmitted to a vehicle 10 in order to bring an electrochemical energy storage mechanism of the vehicle 10 to a higher charge state. To do so, the vehicle 10 has in particular a secondary coil 12. Outside of the vehicle 10 there is a charging unit 14 having a primary coil 16, which generates an electromagnetic alternating field that induces a voltage on the secondary coil 16 according to the induction principle. This voltage can be utilized as charging voltage in the vehicle 10. The electromagnetic alternating field is known as the transmission field 18.

In the application of the device for inductive charging of an automotive energy storage mechanism, the secondary coil 16 may be integrated into the region of the bottom of the vehicle 10. The charging unit 14 is situated outside of the vehicle 10 and may be integrated into a vehicle parking space and/or vehicle charging station, for example.

The power transmission between the charging unit 14 and the vehicle 10 is particularly efficient when the vehicle 10 assumes a charging position, i.e., is localized in the region of the vehicle charging station, so that a good spatial coverage of the secondary coil 12 with the primary coil 16 is established with respect to the x direction and the y direction. The x direction and the y direction relate to the vehicle coordinate system, with which those skilled in the art are familiar, having the x axis along the longitudinal axis of the vehicle, the y axis along the transverse axis of the vehicle and the z axis as the vertical axis of the vehicle. In the charging position, the field range of the transmission field 18, which is situated between the primary coil 16 and the secondary coil 12 during charging, is known as the transmission range.

If an object 20 that interacts with the transmission field 18, for example, a piece of metal, is situated in the transmission range during a charging operation, there is a local change in the transmission field 18 in the region of the metal piece and in the neighboring regions of the metal piece. Eddy currents in the metallic object displace the transmission field 18 out of the interior due to the skin effect. These eddy currents cause the metal piece to heat up.

The heating of the metal piece can be detected by an infrared detector system 22 of the vehicle 10. Without any restriction of generality, the infrared detector system 22 is an infrared camera, for example, which detects an angle of view in the range of the transmission range.

The infrared detector system 22 is characterized by a predetermined spatial resolution limit and a predetermined thermal resolution limit. This means that an object 20 can be detected in the transmission range if the detector system 22 is sensitive enough to the amount of thermal radiation emitted. In the case of a small object, detectability with an infrared detector system is even better, the higher the temperature of the object, i.e., the more thermal radiation is emitted. In the case of an object at a low temperature, its detectability with an infrared detector system is better, the greater the spatial extent of the object, i.e., the more thermal radiation is emitted. This means that small objects which also have a low temperature are much less detectable by the infrared detector system than large objects which also have a high temperature.

This effect may be a disadvantage in inductive charging, for example, if a package object coated with a thin metal film, such as crumpled tin foil, or a beverage carton is situated in the transmission range. Because of the low volume of the metallic content of such an object and the shielding of the metallic content of such objects by non-metallic content (e.g., shielding of the interior metal film with respect to the infrared detector system by exterior cellulose material in the case of a beverage carton), there is the possibility that the aforementioned detection limit is reached only if the thermal radiation emitted by the metal film is so high that the associated temperature of the metal film of material that might be adjacent thereto, such as the cellulose material of the beverage carton, might be able to set fire to neighboring material.

This can be prevented on the example of the beverage carton or the stanniol paper by the fact that the heating of the metal film takes place so slowly that there is a gradual but harmless heating of the carton material or the paper and this in turn emits thermal radiation to the infrared detector system. Then the object 20 in the transmission range can be detected by the infrared detector system 22 at an earlier point in time, before an objectionable evolution of temperature of the metal film. Therefore, this means that an immediate reduction in or shutdown of the transmission field can take place promptly on detection of the object to prevent a further increase in the temperature of the object.

FIG. 1 shows the time curve (3) of the transmission power in the transmission system of the inductive charging device. The transmission power can be regulated by a control unit 24 of the charging unit 14. Control signals can be transmitted from the infrared detector system 22 to the control unit 24.

The electric power is plotted on the y axis (2) as a function of time in a charging operation plotted on the x axis (1). At first there is an increase in the transmission power, i.e., the field strength of the electromagnetic field in the transmission range with a first rate of increase (4) up to a critical point in time (5). After the critical point in time, the transmission power increases further at a second rate of increase (6). The second rate of increase exceeds the first rate of increase.

The first rate of increase is selected to be lower than the second rate of increase, and the critical point in time, which forms a critical period of time with the zero point of the time axis, i.e., the start of a charging operation, is selected to be so late and/or the critical period of time is selected to be so long that, in the example of the beverage carton as a foreign body in the transmission range for detection by the infrared detector system, there is a sufficiently strong energy uptake by the metal film before the critical period of time but without the energy uptake by the metal film leading to a thermally dangerous condition.

If there is no foreign body in the transmission range, no detection event occurs up to the critical point in time, so that the control unit increases the transmission power at the second rate of power increase until reaching a saturation transmission power, which is predefined by the inductive system.

The values for the first rate of power increase, for the second rate of power increase and for the critical point in time are predetermined and are stored in the control unit. These values are preferably determined empirically during the development of the inductive charging device. To do so, one or more standard objects may be used, for example, a piece of tin foil or a beverage carton. Criteria for determining the values for the first rate of power increase, for the second rate of power increase and for the critical point in time include the earliest possible achievement of the saturation transmission power if there is no standard object in the transmission range and detection of the standard object in the transmission range by the infrared detector system before an objectionable temperature has been reached on the standard object, leading to the development of smoke, for example.

According to additional embodiments of the invention, the time curve of the transmission power can be achieved by a non-linear or stepwise control of generation of the transmission field. A non-linear control of generation of the transmission field is, for example, a pulsed activation and deactivation of the transmission field at a predetermined transmission field strength, for example. In doing so, the ratio of the time of activation is increased as a function of time in relation to the time of deactivation. Thus a time increase in the transmission power according to FIG. 1 can be implemented, where the power curve in FIG. 1 forms an envelope for the actual power transmission in a pulsed control.

In a step-wise curve, the transmission power is increased by predetermined constant power values at predetermined points in time. Thus, a time increase in the transmission power according to FIG. 1 can be achieved, where the power curve in FIG. 1 in a step-wise increase in the transmission power forms an envelope for the actual power transmission.

In all embodiments, the power increase in the transmission range is interrupted on detection of a foreign body by the infrared detector system by the control unit and/or the transmission power is reduced in the transmission range by the control unit and/or a warning signal is output by the charging unit or by the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device having a charging unit and being configured for inductive power transmission from the charging unit to a vehicle, wherein the charging unit comprises a primary coil and the vehicle comprises a secondary coil and in which the primary coil generates a magnetic transmission field in a transmission range between the primary coil and the secondary coil, wherein the vehicle comprises a sensor unit for temperature monitoring in the transmission range, the charging unit comprises a control unit, the transmission power being controlled by the control unit during a charging operation as a function of a result of said temperature monitoring, wherein the transmission power is maintained by the control unit at a first rate of power increase until an earlier of an expiration of a predetermined period of time and a detection of a critical object, wherein the transmission power is increased by the control unit to a second rate of power increase in response to the expiration of the predetermined critical period of time and no detection of the critical object, and wherein an object having thermal properties above a thermal resolution limit and spatial properties above a spatial resolution limit is designated as the critical object.

2. The device according to claim 1, wherein the sensor unit is designed as an infrared detector system, wherein the infrared detector system is configured to detect thermal properties and spatial properties of objects situated in the transmission range.

3. The device according to claim 2, wherein at the first rate of power increase, a standard object situated in the transmission range is heated by the transmission field over the predetermined critical period of time, within the predetermined critical period of time, the standard object becomes the critical object, and the power increase in the transmission range is interrupted by the control unit after detection of the standard object by the infrared detector system and/or the transmission power is reduced by the control unit.

4. A method for charging a vehicle by inductive power transmission using a charging unit comprising generating a magnetic transmission field in a transmission range between a primary coil of the charging unit and a secondary coil of the vehicle;

monitoring temperature in the transmission range by a sensor unit of the vehicle;

increasing the transmission power, by a control unit of the charging unit, at the first rate of power increase until an earlier of an expiration of a predetermined period of time and a detection of a critical object;

increasing the transmission power, by the control unit, at the second rate of power increase in response to the expiration of the critical period of time and no detection of the critical object; and interrupting and/or reducing, by the control unit, the transmission power after the detection of the critical object during the predetermined critical period of time or after the predetermined critical period of time, and wherein an object having thermal properties above a thermal resolution limit and spatial properties above a spatial resolution limit is designated as the critical object.

* * * * *